United States Patent Office 2,830,361
Patented Apr. 15, 1958

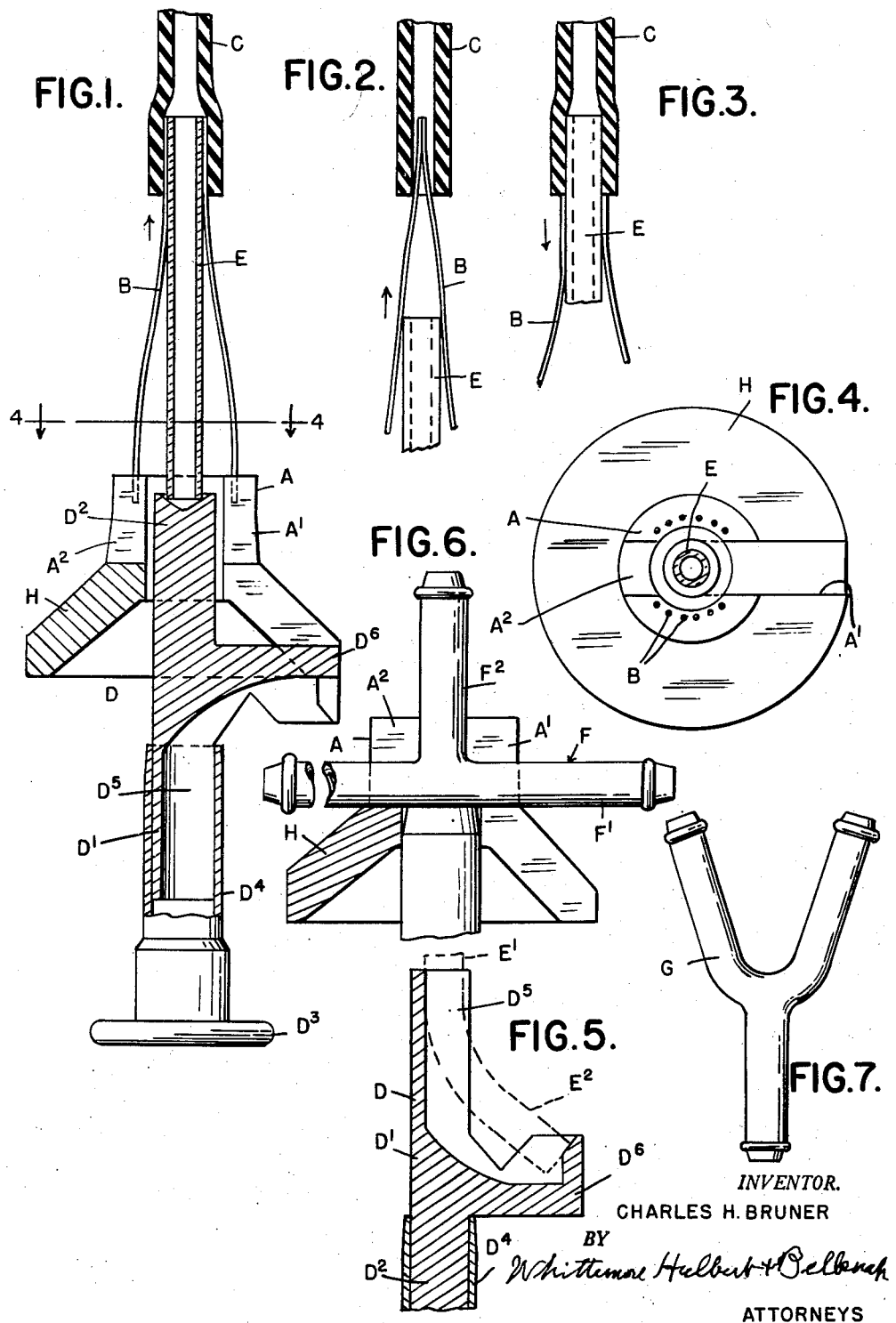

2,830,361
MEANS FOR SLEEVING FLEXIBLE TUBING ON RIGID TUBES

Charles H. Bruner, East Detroit, Mich.

Application February 21, 1955, Serial No. 489,485

5 Claims. (Cl. 29—235)

In the performance of experimental work in laboratories it is frequently necessary to connect different elements of an apparatus by tubing, usually of glass, and it is the usual practice to couple rigid tubes by rubber or other resilient tubing. To accomplish this manually is difficult, partciularly where the rubber tubing is of sufficient weight to be resistant to expansion and there is always danger that a glass tube may be broken with injury to the operator.

It is the object of my invention to provide means for easily and quickly expanding the rubber tube and sleeving the same over the rigid tube. It is a further object to protect the operator against injury in case a glass tube should be broken. With these objects in view the invention consists in the construction as hereinafter set forth.

In the accompanying drawings:

Fig. 1 is a longitudinal section through the apparatus showing the parts in position where the rigid tube has been inserted within the end portion of a flexible tube which is expanded thereby.

Fig. 2 shows a portion of Fig. 1 in the first step of the operation.

Fig. 3 is a similar view showing the engaged rigid and flexible tubes disengaged from the fingers for expanding the same.

Fig. 4 is a section on line 4—4, Fig. 1.

Fig. 5 is a view similar to a portion of Fig. 1 showing a bent tube in engagement therewith.

Fig. 6 is a view similar to a portion of Fig. 1 showing a T-shaped tube engaged therewith.

Fig. 7 is an elevation of a Y-shaped tube.

As shown A is a ring shaped member which has secured thereto a series of flexible fingers B, preferably formed of resilient wire, being distributed around the ring and extending therefrom in a conical path to a relatively small diameter at their outer ends. This permits of inserting the fingers into the end portion of a rubber or other resilient tube C. D is a rod movable through the aperture in the ring A and adapted to push before it a length of rigid tubing E, such as a glass tube. As the outside diameter of the tube E is larger than the internal diameter of the tube C the former will come in contact with the fingers B and in its further movement will move said fingers radially outward, thereby expanding the tube C. This will continue until the outer end of the tube E passes beyond the ends of the fingers and into contact with the contracted portion of the tube C, whereupon friction between said tubes will advance them together until withdrawn from the fingers B, leaving the resilient tube sleeved about the rigid tube.

Tubes to be connected are not always straight as is the tube E but are sometimes in the form of angle tubes, T-shaped tubes or Y-shaped tubes. To permit of engaging such tubes with the flexible tube the fingers B, instead of extending completely about the ring A, are arranged in spaced groups. This will leave an opening therebetween sufficient for the lateral insertion or withdrawal of a tube member. Also, the ring A is slotted at A' on one side in registration with the space between the groups of fingers so that a bent tube may be passed therethrough. As shown in Fig. 5, a tube E' has a straight portion and a bent portion $E^2$ which is quite a common form used in laboratory apparatus. To engage such a tube with the pusher member D the latter is preferably formed in two sections D' and $D^2$ telescopically engaging each other. The section $D^2$ is provided with a handle $D^3$ and a tubular portion $D^4$ for receiving the end of the section D'. This section D' is reversible, one end portion $D^5$ thereof being tubular, cut away at one side, and also having a laterally projecting portion $D^6$ which is fashioned to receive the curved end portion $E^2$ of the tube E'. The projecting portion $D^6$ is capable of passing through the slot A' pressing the tube E' against the fingers B as previously described. Where a straight tube E is used the section D' can be reversed and its opposite end pressed against said tube to advance the same.

To permit of using a T-shaped tube the ring A is partially cut away on the side diametrically opposite the slot A' to form a slot $A^2$. These slots together will receive the head F' of a T-tube F, the shank $F^2$ of which will be forced between the fingers. The head portion F' may also be engaged at either end with a flexible tube by correspondingly positioning it within the ring A. A Y-shaped tube, such as G, may also be used and any end portion thereof engaged with the flexible tube.

It has been mentioned that glass tubes are sometimes broken when being manipulated with danger of injuring the hands of the operator. I have, therefore, provided a guard member H which is preferably integral with the ring A' and extends radially outward beyond the same. This will form a shield for the hand that is manipulating the member D so as to protect it from any glass splinters. This guard H is slotted in registration with the slot A' for the passage of the portion $D^6$ therethrough. It is not, however, slotted on the opposite side and may constitute a rigid connection between the portions of the ring A which are on opposite sides of the slots A' and $A^2$.

What I claim as my invention is:

1. Means for expanding and sleeving over an end portion of a rigid tube a corresponding end portion of a resilient tube which has relatively high resistance to radial expansion which comprises a hand tool including a ring adapted to be grasped by the hand, said ring having an integral conical flange extending radially outward from the lower portion thereof forming a finger hold and also a guard for protecting the hand of the user in cases of shattering of a glass tube, a series of flexible resilient wire fingers secured to, spaced and distributed in a circle about said ring to extend therefrom through a converging conical path to a small diameter at their free ends insertable within the small internal diameter of said end portion of said resilient tube, said fingers being omitted from a segment of said circle leaving an opening and said ring and flange being cut away in registration with said opening, whereby a rigid tube having a lateral projection may be inserted and moved axially within said wire fingers with said lateral projection movable through said cut away portion and through said opening between the fingers, said axial movement of said rigid tube simultaneously expanding said resilient tube and flexing said fingers into parallelism therewith, the continued movement withdrawing said fingers from between said tubes.

2. The construction as in claim 1 in which said fingers are omitted also from a diametrically opposite side of the circle for passage of an opposite laterally projecting portion of said rigid tube.

3. The construction as in claim 2 in which said ring is also cut away in registration with said last mentioned omitted fingers, said integral guard flange rigidly connecting the ring portions on opposite sides thereof.

4. Means for expanding and sleeving over an end portion of a rigid tube a corresponding end portion of a resilient tube which has relatively high resistance to radial expansion which comprises a hand tool including a ring adapted to be grasped by the hand, said ring having an integral conical flange extending radially outward from the lower portion thereof forming a finger hold and also a guard for protecting the hand of the user in case of shattering of a glass tube, said ring and flange having a cut away portion, a series of flexible resilient wire fingers secured to, spaced and distributed in a circle about said ring to extend therefrom through a converging conical path to a small diameter at their free ends insertable within the small internal diameter of said end portion of said resilient tube, a plunger slidable within said ring for engaging a rigid tube, said plunger having a lateral projection extending through said cut away portion and being channeled to receive a lateral projection of said rigid tube whereby said rigid tube may be inserted and moved axially within said wire fingers and the latter moved longitudinally of said rigid tube to draw said fingers and surrounding resilient tube over the same, simultaneously expanding said resilient tube and flexing said fingers into parallelism therewith, the continued movement withdrawing said fingers from between said tubes.

5. The construction as in claim 4 in which said plunger is formed in two sections telescopically engaging each other, one having a handle thereon and the other having said lateral projection and being reversible end for end for use respectively with a straight rigid tube and a rigid tube with lateral projection.

References Cited in the file of this patent

UNITED STATES PATENTS

| | | |
|---|---|---|
| 464,093 | Cartwright | Dec. 1, 1891 |
| 1,408,039 | Snyder | Feb. 28, 1922 |
| 1,629,207 | Drummond | May 17, 1927 |

FOREIGN PATENTS

| | | |
|---|---|---|
| 151,849 | Australia | June 11, 1953 |